Sept. 26, 1939.   R. E. BEAUFOUR   2,174,434
BED FOR INVALIDS
Filed Feb. 21, 1936   4 Sheets-Sheet 1
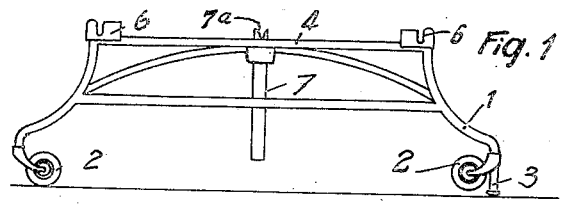
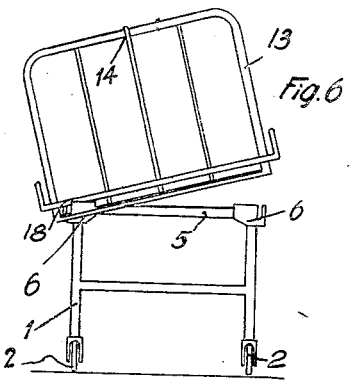
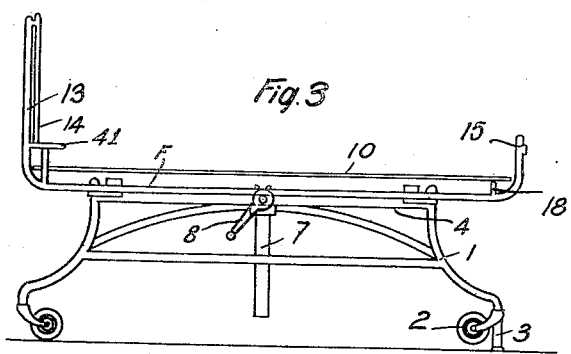
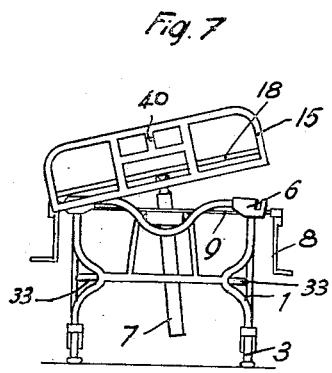
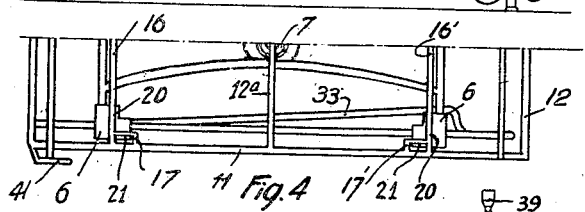
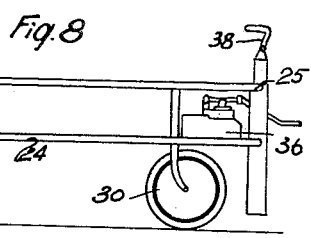
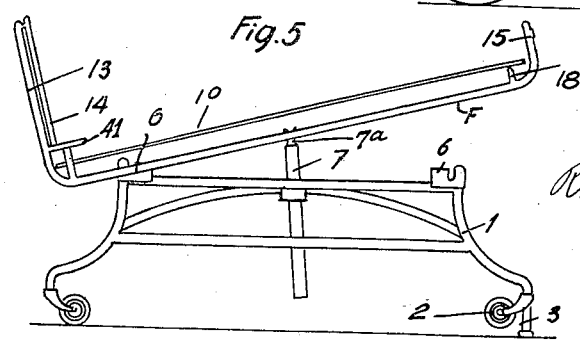
Inventor
Robert Emile Beaufour
By B. Linger, Atty.

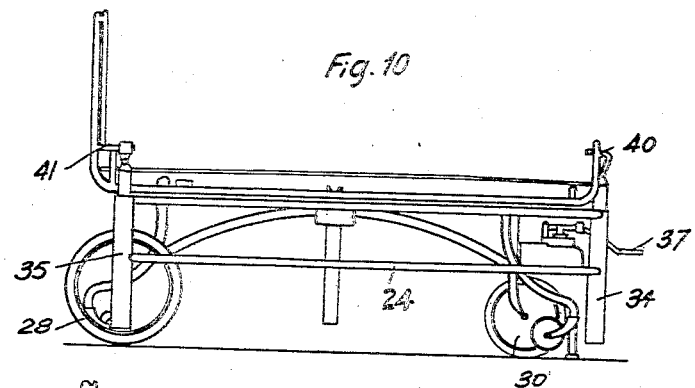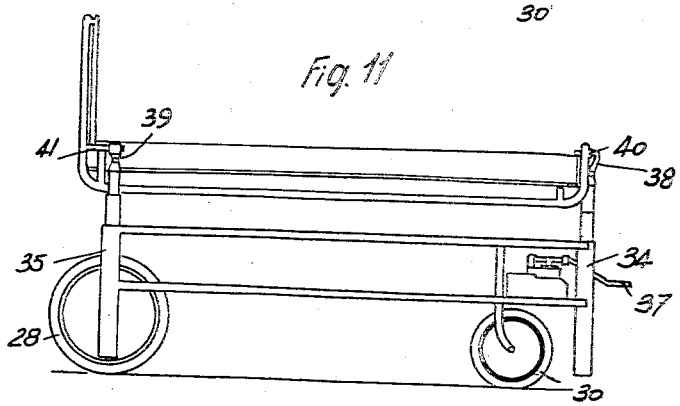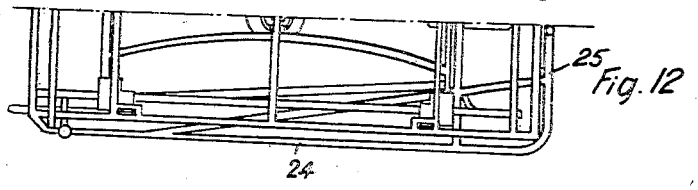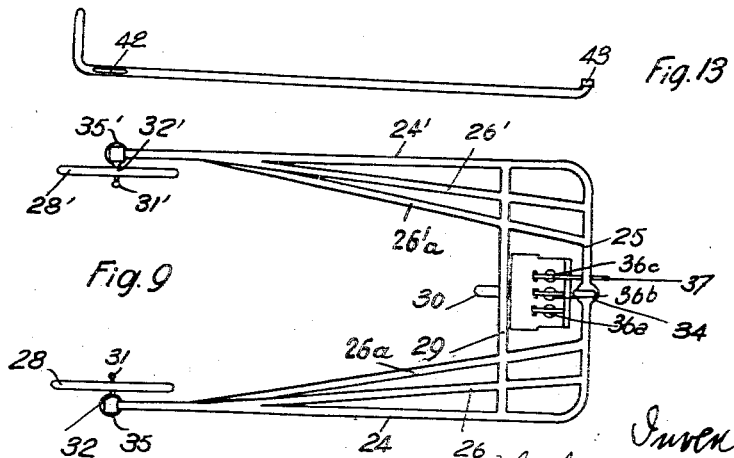

Sept. 26, 1939.  R. E. BEAUFOUR  2,174,434
BED FOR INVALIDS
Filed Feb. 21, 1936  4 Sheets-Sheet 3
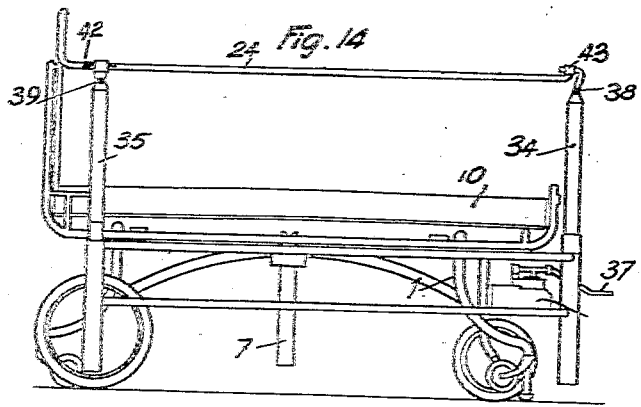
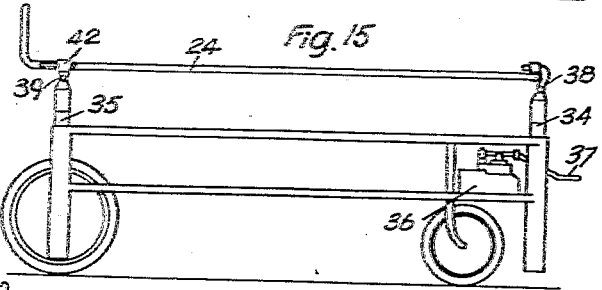
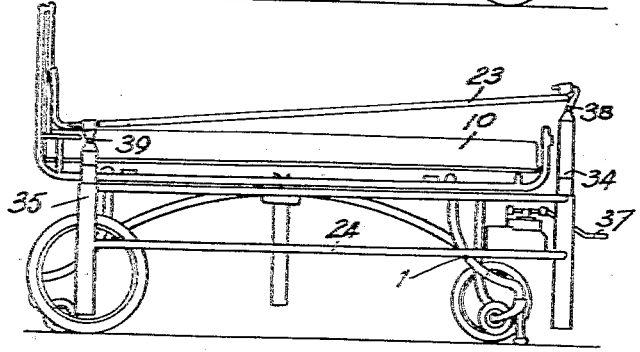
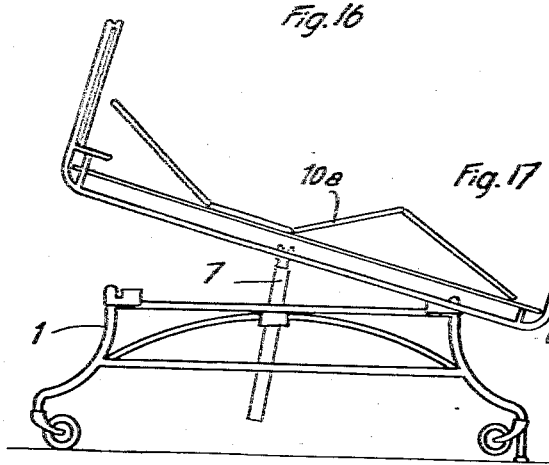

Patented Sept. 26, 1939

2,174,434

UNITED STATES PATENT OFFICE 2,174,434

BED FOR INVALIDS

Robert Emile Beaufour, Paris, France

Application February 21, 1936, Serial No. 65,147
In France February 25, 1935

4 Claims. (Cl. 5—85)

The present invention relates to beds and especially beds for invalids, wounded persons, people having undergone an operation, etc.

Up to the present time, in hospitals, invalids are transported by one or two men who place them, with more or less commodity, on a stretcher, from which said invalids have to be removed for being placed on the operation table. After the operation has been performed, the same operations have to be effected in the reverse order, which causes considerable pains to the patient, whatever be the precautions that are taken. The same is true when, for any reason, a patient has to be moved from one bed to another bed. As a matter of fact, the pain and risks are so great that in many cases the displacement of the patient or invalid is avoided, however desirable it may be from another point of view.

Furthermore, in order merely to give certain treatments to an invalid in his bed, it was necessary, up to the present time, to make use of elevating apparatus which are both ugly and cumbersome and which, although facilitating certain operations, rendered the access to the bed rather difficult. There also exists a system of frame called "strap-support" which can be moved vertically about the bed after the straps have been slipped between the patient and the mattress of the bed on which he is lying. But the vertical displacement of this frame does not permit of avoiding the shocks produced by the movement of the ropes or cables on the upper winch through which the system is operated. The patient, lifted above his mattress and subjected to the swinging movement of the frame, has not the feeling of stability and safety that is necessary for him.

The object of the present invention is to provide an apparatus which obviates all these drawbacks and which permits, on the one hand, transportation of the patient to any distance without necessitating his removal from his usual strap support or even from his normal mattress and without subjecting him to any shock; and, on the other hand, of giving said mattress, on which the patient is lying all the longitudinal and transverse inclinations that may be necessary in some cases.

The essential feature of the present invention consists in the provision of a transportation carriage the frame of which is in the form of a stirrup so that it can be brought about the bed by being engaged through one of its ends, said carriage including at least three vertical jacks adapted to be removably assembled, either with the setting of the spring mattress of this bed or with the setting of the frame interposed between the patient and the bed mattress. The upward movement of the jacks then lifts this spring mattress and this frame and its wholly stable fixation on the carriage, which can then be removed from the bed, for transportation of the patient.

Preferred embodiments of the present invention will be hereinafter described with reference to the accompanying drawings, given merely by way of example, and in which:

Fig. 1 is an elevational view of the bedstead of an apparatus according to the invention;

Fig. 2 is an elevational view of the mattress carrying frame;

Fig. 3 is an elevational view of this frame bearing upon the bedstead;

Fig. 4 is a half plan view of the bed according to Fig. 3;

Fig. 5 shows the mattress carrying frame in a position inclined toward the rear;

Figs. 6 and 7 are vertical views showing this frame inclined laterally, seen from the rear and from the front, respectively;

Fig. 8 is an elevational view of the transportation carriage;

Fig. 9 is a plan view corresponding to Fig. 8;

Fig. 10 shows this carriage engaged around the bed;

Fig. 11 shows the carriage supporting the mattress carrier after the latter has been lifted above the bedstead;

Fig. 12 is a half plan view corresponding to Fig. 11;

Fig. 13 is an elevational view of a strap carrying frame;

Fig. 14 illustrates the lifting of the strap carrying frame above the mattress;

Fig. 15 shows the carriage supporting the strap carrying frame after disengagement from with the bed;

Fig. 16 is a view, analogous to Fig. 15, showing the inclination of the strap carrying frame;

Fig. 17 shows a modification of the spring mattress and another arrangement of the mattress carrying frame;

Figure 18:
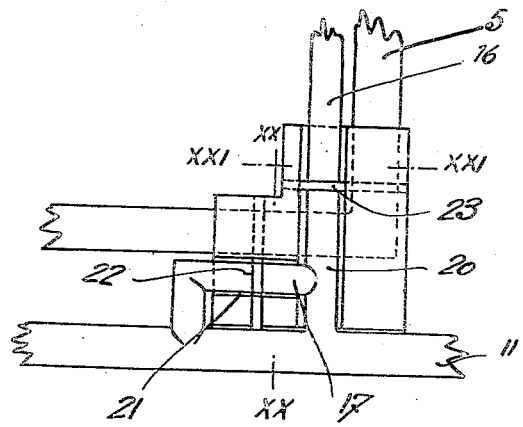
Figs. 18 to 21 show the detail of the articulations of the mattress carrying frame on the bedstead, Fig. 18 being a plan view, Fig. 19 an elevational view, Figs. 20 and 21 sectional views on the lines XX—XX and XXI—XXI of Fig. 18.

The bed according to the invention consists essentially in two parts, to wit: a bedstead shown on Fig. 1 and a spring mattress carrying frame F shown on Fig. 2. The bedstead includes a carcass 1 supported by rollers 2, at least two of which are provided with crutches 3 movable to engage the floor and lift wheels 2 which permits of fixing the structure with respect to the ground. This carcass is provided at its upper part with a rectangular frame 4—5, at the corners of which are provided articulation members 6, the detailed structure of which will be hereinafter described.

At the central part of this frame there is mounted, in a swivel manner, the body of a rack or other lifting jack of the movable head 7a (Fig. 5) of which is adapted to engage, in a removable manner, through its slot 7a with the central cross member 12a of the mattress carrying frame, and which is operated, from the outside of the bed, by means of one or two cranks 8 acting on either side of the bed through an operating shaft 9 (Fig. 7).

This bedstead supports the mattress carrying frame F shown in Fig. 2, which may receive, at will, spring mattresses of usual types, either with elastic blades or coil springs, such a mattress being diagrammatically shown at 10, or jointed mattresses, such as diagrammatically shown at 10a in Fig. 17.

This mattress carrying frame is provided with longitudinal and cross members 11 and 12 respectively, a head 13 with a guide 14 for the strap support which will be hereinafter referred to, a foot part 15, a central cross member 12a and intermediate cross members 16 and 16', combined with angle shaped pieces 17 nad 17', cooperating with supporting pieces 6 as will be hereinafter described. Finally, the spring mattress rests upon cross members 18 of frame F.

Members 6 are intended, as above stated, to permit the hinging connection of the mattress carrying frame F with the bedstead in either of the front and rear longitudinal directions or in either of the right hand side or left hand side directions.

In order to permit the inclination of the mattress for instance toward the rear as shown by Fig. 5, it is necessary to disengage frame F from the supports 6 at the foot of the bed and to keep said frame F engaged in the supports 6 at the head of the bed so as to permit of pivoting the mattress carrying frame F about the axis of cross member 16.

In order to incline this mattress carrying frame F in the lateral direction (Figs. 6 and 7), it is, on the contrary, necessary to disengage said frame F from the two supports 6 located on one side and to pivot the frame F about the common axis of members 17 and 17' journalled in the supports 6 located on the other side of the bed.

Figure 19:
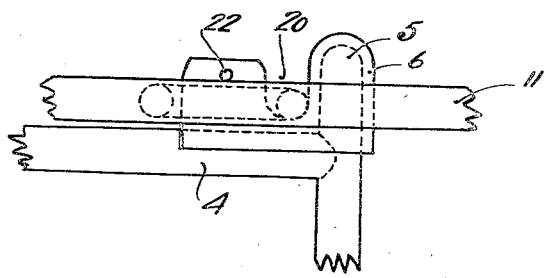
Figure 20:
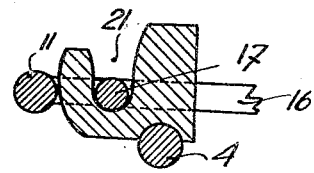
Figure 21:
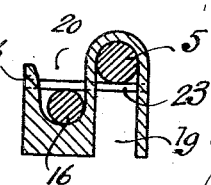

For this purpose, as shown by Figs. 18 to 21, these supporting members 6, which fit on the longitudinal and cross members 4 and 5 of the bedstead owing to the provision of a groove 19 and which are fixed to said members in a permanent manner, are provided, at their upper part, with two grooves 20 and 21 at right angles, opening upwardly and in which members 16 and 17 or 17', respectively, are adapted to fit.

Each member 17 or 17' can be held in the corresponding groove 21 by a pin 22 engaged in the corresponding support 6 and each member 16 can be held in the corresponding groove 20 by a pin 23 engaged in the corresponding support 6.

It is therefore very easy to pivot the mattress carrying frame F as above described and to give the patient lying on the bed various inclinations corresponding to suitable treatments.

When a jointed spring mattress 10a is used, as shown by Fig. 17, it is even possible to bring the patient into a seating position without subjecting him to any shock.

The essential characteristics of the present invention lies in the fact that the mattress carrying frame F can be lifted from the bedstead and placed on a transportation carriage so as to be conveyed anywhere it is desired without subjecting the patient to shocks.

The carriage that is provided for this purpose, more especially shown on Figs. 8 and 9, includes a frame having in horizontal projection the shape of a U and consisting of two longitudinal members 24 and 24' and a transverse member 25. This frame is strengthened by oblique bracing members 26, 26a and 26', 26'a (Fig. 9), and a cross member 29, whereby the whole structure is sufficiently rigid although it has but three sides.

At the end of longitudinal members 24 and 24' there are provided wheels 28 and 28' and on the vertical line of a reinforcing member 29 there is provided an axial wheel 30.

This arrangement permits of bringing the carriage around the bed by engaging it through its open end.

In this movement, the carriage is guided by rollers 31—31' provided at the ends of small rods 32, 32' carried by the frame of the carriage and which run along the divergent members 33 of the bedstead (visible in Fig. 4).

This carriage is provided with three lifting devices 34, 35, 35' which, in the various figures of the drawings, are shown in the form of hydraulic jacks but which might consist of any mechanical, electrical, or pneumatic devices, the oil pump 36 shown in the drawings being replaced, in this case, by a motor, an inflating apparatus, an air bottle, or any other suitable means.

Pump 36 includes three barrels 36a, 36b and 36c, each corresponding to one of the lifting jacks above mentioned, these three pump elements being operated through a single member, such as a lever 37, as shown by the drawings, or a pedal. However, each of these three pump elements includes a distinct stopping means in such manner that the operating of lever 37 can bring into play a single pump element and therefore a single lifting jack or any combination of two of these pump elements and therefore of two of these lifting jacks.

The three lifting jacks are provided, at their ends, with respective swivel heads 38, 39, 39'. Head 38 is of male structure and it cooperates, when the carriage is engaged around the bed, with a housing or recess 40 provided in the foot part of the mattress carrying frame. Heads 39 and 39' are of female structure that is to say are provided with horizontal holes into which engage pins 41 and 41', respectively, rigid with the head part of the mattress carrying frame F. When the carriage is engaged around the bed, as shown by Figs. 10 and 11, said carriage is thus made fast with this mattress carrying frame F through these heads of the lifting jacks.

By acting on the operating member 37 of pump 36, it is thus possible to lift the mattress carrying frame with respect to the bedstead and when said frame has been brought, for instance, to the level shown by Fig. 11, the patient can be conveyed anywhere, for instance to an operation table, by merely moving said carriage rearwardly, which moves it away from the bedstead.

By acting on the individual stopping means of the pump elements 36a, 36b, 36c, I may also move upwardly or downwardly any of these jacks with respect to the others, so as to incline the patient in any desired direction, for instance for sun-bathing or treatment by therapeutic rays.

The device according to the present invention also permits, under analogous conditions, of lifting a strap carrying frame with respect to the mattress upon which it rests normally, so as to permit of nursing the patient, examining him, tidying the bed, etc. Also, in this case, it is possible to transport the patient, no longer on his mattress, but on said strap carrying frame.

For this purpose, the strap carrying frame S of Fig. 13 is provided, near the head part thereof, with lateral pins 42, 42', and, at the foot, with a housing 43, these parts 42, 42' and 43 cooperating with the heads of the jacks under the same conditions as the corresponding parts 40, 41, 41' of the mattress carrying frame.

When the strap-carrying frame rests upon the mattress-carrying frame, the holding parts of the strap carrier are located slightly ahead of and above the corresponding holding parts of the mattress carrier, so that, when it is desired to lift only the strap carrier, the carriage will be brought around the bed in the same conditions as above described but after having previously slightly raised the wheels and by slightly moving the carriage toward the rear a distance sufficient for disengaging the holding organs of the jack carriers from with members 40, 41 and 41' and, on the contrary, bringing them into engagement with parts 42, 42' and 43. It should be noted that the strap carrier is longer and wider than the spring mattress and the mattress and therefore permits of passing said spring mattress and mattress in the space inside said strap carrier when the straps have been unfastened, for instance when the spring mattress is to be given the position shown by Fig. 14.

By acting on operating member 37 under the same conditions as above explained, this strap carrying frame can be lifted above the mattress, as shown by Fig. 14.

The space left between the strap carrying frame and the mattress, as shown in this figure is quite sufficient for nursing the patient, tidying the bed, etc. According to the needs, the strap carrier may be lifted to different heights intermediate with respect to that shown by Fig. 14. It should be noted that, in any of these various positions, the strap carrier is maintained not only by the jack heads but also by the guide 14 of the mattress carrier, which avoids any risk of buckling of the jacks when the latter are in expanded position. Of course, the strap carrying frame may be given various inclinations as above explained with reference to the mattress carrying frame. For instance, Fig. 16 shows an inclined position in which, the head of the frame bearing on the mattress, the foot is raised above this level, such a position being, for instance, advisable in the case of phlebitis of the lower limbs.

When it is desired to transport the patient, the frame is merely lifted to a height at which the straps are disengaged from the mattress, that is to say a height of only some centimeters. The patient can thus be transported directly above an operation table, the frame surrounding said table in the same way as in the case of the bedstead.

It is then possible to lay down the patient on said table without having to handle him and it suffices, once this has been done, to unfasten the straps on one side and to slip them under the patient in the usual manner.

After the operation has been performed, the patient can be returned to his bed as smoothly and safely. The transportation in both directions is thus effected without shock and without danger for the patient and without any effort for the person who is to effect this transportation.

Of course, when the carriage is to be brought around the bed, the cranks 8 for driving shaft 9 must be removed.

In a general way, it should be well understood that, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A travelling support for a bed section which comprises, in combination, a carriage having, in plan view, the shape of a U the branches of which are adapted to engage on either side of said bed section, and at least three vertical jacks carried by said carriage and arranged to engage the periphery of the upper part of said bed section so as to lift said upper part of the bed section and to support it.

2. A travelling support for a bed section which comprises, in combination, a carriage having, in plan view, the shape of a U the branches of which are adapted to come on either side of said bed section, and lifting means carried by said carriage and arranged to engage under the periphery of the upper part of said bed section, so as to lift said upper part of the bed section and to support it.

3. A travelling support for a bed section which comprises, in combination, a carriage having, in plan view, the shape of a U the branches of which are adapted to come on either side of said bed section, and at least three lifting devices carried by said carriage and arranged to engage under the periphery of the upper part of said bed section, so as to lift said upper part of the bed section and to support it.

4. A travelling support for a bed section which comprises, in combination, a carriage having, in plan view, the shape of a U the branches of which are adapted to come on either side of said bed section, and three jacks carried by said carriage, one at the middle part of the U, the two others at the respective ends of the branches of said U, arranged to engage under the periphery of the upper part of said bed section, so as to lift said upper part of the bed section and to support it.

ROBERT EMILE BEAUFOUR.